US011428838B2

(12) United States Patent
Zhang et al.

(10) Patent No.: US 11,428,838 B2
(45) Date of Patent: Aug. 30, 2022

(54) 4D TIME SHIFT AND AMPLITUDE JOINT INVERSION FOR VELOCITY PERTURBATION

(71) Applicant: BP Corporation North America Inc., Houston, TX (US)

(72) Inventors: Tingting Zhang, Katy, TX (US); Simon Luo, Houston, TX (US); Anar Yusifov, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 326 days.

(21) Appl. No.: 16/840,771

(22) Filed: Apr. 6, 2020

(65) Prior Publication Data

US 2020/0348434 A1    Nov. 5, 2020

Related U.S. Application Data

(60) Provisional application No. 62/842,286, filed on May 2, 2019.

(51) Int. Cl.
*G01V 1/30* (2006.01)
*G01V 1/38* (2006.01)

(52) U.S. Cl.
CPC .............. *G01V 1/308* (2013.01); *G01V 1/303* (2013.01); *G01V 1/306* (2013.01); *G01V 1/38* (2013.01);
(Continued)

(58) Field of Classification Search
CPC ........... G01V 1/308; G01V 2210/1234; G01V 2210/59; G01V 2210/6122;
(Continued)

(56) References Cited

U.S. PATENT DOCUMENTS 7,577,061 B2    8/2009  Williamson et al.
9,690,001 B2 *  6/2017  Thore ................... G01V 1/306
(Continued)

FOREIGN PATENT DOCUMENTS

GB          2470760       12/2010

OTHER PUBLICATIONS

Grandi, "Quantitative 4D Warping Inversion", International Petroleum Technology Conf., Dec. 7, 2009, pp. 1-8.*
(Continued)

*Primary Examiner* — Catherine T. Rastovski
(74) *Attorney, Agent, or Firm* — Conley Rose, P.C.

(57) ABSTRACT

A method of performing single trace inversion to characterize changes in a subsurface region includes obtaining a base seismic trace and a monitor seismic trace of the subsurface region at different respective times. The method includes generating a predicted monitor seismic trace from the base seismic trace by a process including applying a time shift to the base seismic trace, the time shift being derived from estimated velocity perturbations occurring between the base seismic trace and the monitor seismic trace, compensating for amplitude changes between the base seismic trace and the monitor seismic trace, wherein the time shift is applied to the amplitude changes, and minimizing a difference between the predicted monitor seismic trace and the monitor seismic trace by iteratively estimating the velocity perturbations to obtain final estimated velocity perturbations. Changes of at least part of the subsurface region may be characterized using the final estimated velocity perturbations.

20 Claims, 8 Drawing Sheets

(52) U.S. Cl.
CPC ............... *G01V 2210/1234* (2013.01); *G01V 2210/59* (2013.01); *G01V 2210/6222* (2013.01)

(58) Field of Classification Search
CPC ........... G01V 2210/6222; G01V 1/303; G01V 1/306; G01V 1/38
See application file for complete search history.

(56) References Cited

U.S. PATENT DOCUMENTS

| | | | | |
|---|---|---|---|---|
| 2008/0291781 | A1* | 11/2008 | Williamson | G01V 1/308 367/38 |
| 2013/0215712 | A1* | 8/2013 | Geiser | G01V 1/308 367/9 |
| 2016/0245065 | A1* | 8/2016 | Gray | G01V 1/306 |
| 2018/0259662 | A1* | 9/2018 | Srinivasan | G01V 1/36 |

OTHER PUBLICATIONS

Grandi, A Et.al: Quantitative 4D Warping Inversion; International Petroleum Technology Conf., Dec. 7, 2009, p. 1-8.
International Search Report and Written Opinion dated Aug. 4, 2020, for PCT/US2020/026853, filed on Apr. 6, 2020.

\* cited by examiner

4D TIME SHIFT AND AMPLITUDE JOINT INVERSION FOR VELOCITY PERTURBATION

This application claims priority to U.S. Provisional patent application No. 62/842,286, filed with the United States Patent and Trademark Office on May 2, 2019 and entitled "4D Time Shift and Amplitude Joint Inversion for Velocity Perturbation," the disclosure of which is incorporated herein by reference in its entirety.

BACKGROUND

The present disclosure relates generally to identifying changes within a subsurface region of the Earth over a period of time using seismic survey results. The present disclosure also relates generally to aligning seismic images that represent the same area of subsurface during a seismic survey.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir (e.g., overburden, interval) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A method of single trace inversion for estimating the velocity perturbation from a 4D seismic dataset of a subsurface region is provided. The 4D seismic dataset includes two 3D surveys from two points in time of the same area—a base or baseline survey and a monitor survey. The base survey and monitor survey each have seismic traces representative of the manner in which seismic waves are reflected within the subsurface region. Velocity changes of the seismic waves used for the 3D surveys lead to time shift in the traces. Amplitude changes between the base traces and monitor traces can result from either velocity perturbation and/or density perturbation. For some cases, if density perturbation is negligible, the velocity perturbation will be the reason for both time shift and amplitude change.

The single trace inversion process of one or more embodiments uses the two 3D seismic datasets (including a base seismic trace and a monitor seismic trace), and an estimated wavelet for the reservoir of the subsurface region. An objective function used for the inversion process is defined with least-square minimization. Specifically, one or more embodiments minimizes a least squares difference between a predicted monitor seismic trace and an observed monitor seismic trace (where the difference is expressed by the objective function). Velocity perturbation, which is represented in the objective function, is iteratively estimated to minimize the least squares difference between the predicted monitor seismic trace (generated based upon the base seismic trace) and the observed monitor seismic trace. The generated predicted monitor seismic trace generally has two parts. One part applies the time shift (which results from estimated velocity perturbation) to the base seismic trace, and another part compensates the amplitude change from the baseline seismic trace to the monitor seismic trace with estimated velocity perturbation. A time shift correction is also applied to the amplitude change.

Once the velocity perturbation is estimated to the point where the difference between the predicted monitor trace and the observed monitor trace is at or below a threshold, the estimated velocity perturbation may be used to characterize changes in the subsurface region under study. As an example, a map of velocity perturbation of the subsurface region may be generated to characterize changes in the region between the time when the base survey is taken and the time when the monitor survey is taken.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
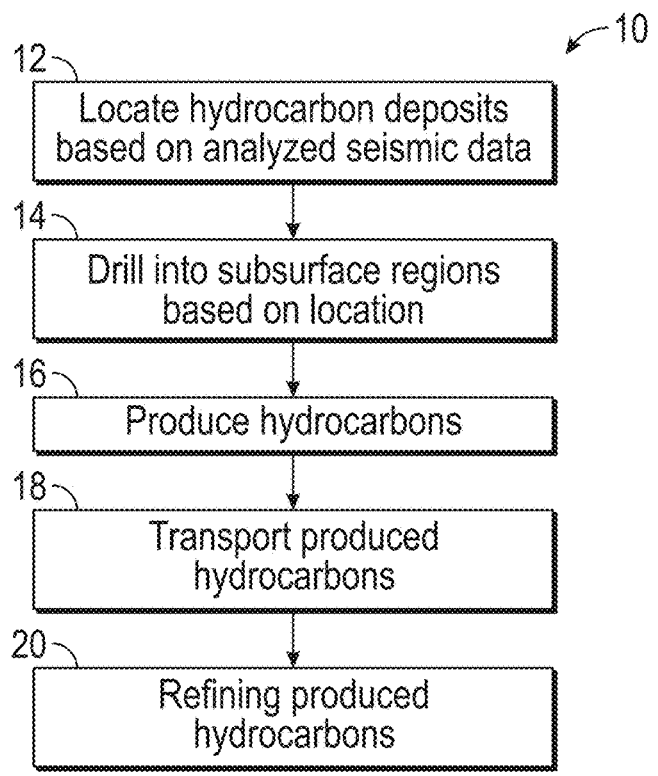
FIG. 1 is a flow chart of various processes that may be performed based on analysis of seismic data acquired via a seismic survey system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, seismic data processing may provide valuable information with regard to subsurface regions of the Earth, such as the location and characteristics of hydrocarbon deposits. Seismic data taken over time may also be processed to assess how those regions may change over time (evolve), for example due to hydrocarbon production. Based on how the geological formation of the Earth and the location and characteristics of the hydrocarbon deposits change over time, hydrocarbon production operations may be modified to extract hydrocarbon deposits more efficiently.

One manner of obtaining more accurate data representing geological formations includes performing, in accordance with the present disclosure, a method of single trace inversion for estimating the velocity perturbation from a 4D seismic dataset. Generally, a 4D seismic dataset of the present disclosure includes at least two 3D surveys from two or more time points of the same area/field. For simplicity, two 3D surveys taken at different points in time are discussed. As described herein, "inversion" is intended to denote a process where a model of a subsurface region is estimated based on acquired seismic data (e.g., seismic surveys).

One of the 3D surveys (e.g., a first survey) may be considered a base seismic survey or a "base survey," and another of the 3D surveys (e.g., a second survey) may be considered a monitor seismic survey or a "monitor survey." The base survey and the monitor survey both include a corresponding set of seismic traces, and the seismic traces of each of the surveys is representative of the subsurface region being analyzed at a respective point in time (or time period). In accordance with present embodiments, the base survey is performed before the monitor survey. Thus, differences between the surveys may be indicative of changes in the subsurface region of interest, and the monitor survey may be taken to evaluate changes in the subsurface region some period of time after the base survey, for example to evaluate how hydrocarbon production has affected the subsurface region.

More specifically, changes in the subsurface region between the time at which the base survey is taken and the time at which the monitor survey is taken will result in changes in the propagation of seismic waves through the region. For example, changes in the subsurface region may include a change in the materials in the region, which can affect the speed at which seismic waves propagate through the region and the nature of the reflections of seismic waves. Accordingly, seismic traces of the base survey and the monitor survey may differ in terms of the amplitude of various peaks of the seismic waves, and the seismic traces may differ in terms of the time at which these peaks are received at the receivers which generate each individual seismic trace. Each seismic trace may include a series of points, and each of these points may have an associated velocity at that point for the seismic wave. A difference in velocity at a given point between a base survey trace and a monitor survey trace can be evaluated to determine, for example, changes in the subsurface region at a location corresponding to the point.

In accordance with the present embodiments, shifting the base survey traces to match the monitor survey traces may be performed to estimate localized velocity perturbations. As described herein, a velocity perturbation is considered to represent, at a given point on a seismic trace, a perturbation in the velocity of a seismic wave between the base seismic survey and the monitor seismic survey at that point. The velocity perturbation at a point on a seismic trace may be expressed mathematically as the difference in the velocity between the base survey and the monitor survey at the point, divided by the velocity of the base survey at that point.

The localized velocity perturbations may be used collectively to evaluate changes in the subsurface region. As an example, a local velocity perturbation may generally be considered to result from a change in the seismic reflector at that location. Thus, a map of velocity perturbation of the subsurface region may be generated to show how the materials in that region have changed over time. This, in turn, may allow production processes to be adjusted to enhance efficiency of subsurface operations, such as hydrocarbon extraction.

The shifting of the base seismic trace to match the monitor seismic trace may be performed by a process in which the velocity perturbation between individual data points of the base and monitor traces is iteratively estimated. The iterations are performed until a difference between the base and monitor traces is minimized to a predetermined threshold. Once the difference is minimized in this fashion, the velocity perturbations may be used to construct the velocity map noted above.

One or more embodiments can perform minimization of the difference (as expressed via an objective function), where the minimization is performed by implementing a least squares optimization algorithm. The optimization algorithm may account for changes between the base survey and the monitor survey that arise from time shifts and that arise from amplitude changes.

As one example, a computing system may use the velocity perturbation characteristics to update various seismic velocity models, seismic images, reservoir characteristic maps, and the like to more accurately determine the locations and properties of various geological formations within the subsurface region of the Earth. As such, hydrocarbon exploration operations (e.g., drilling, selection of drilling locations, production) may be improved by modifying the operations according to the updated locations and properties of the hydrocarbon deposits within the subsurface region according to the updated velocity models or updated seismic images.

Figure 2:
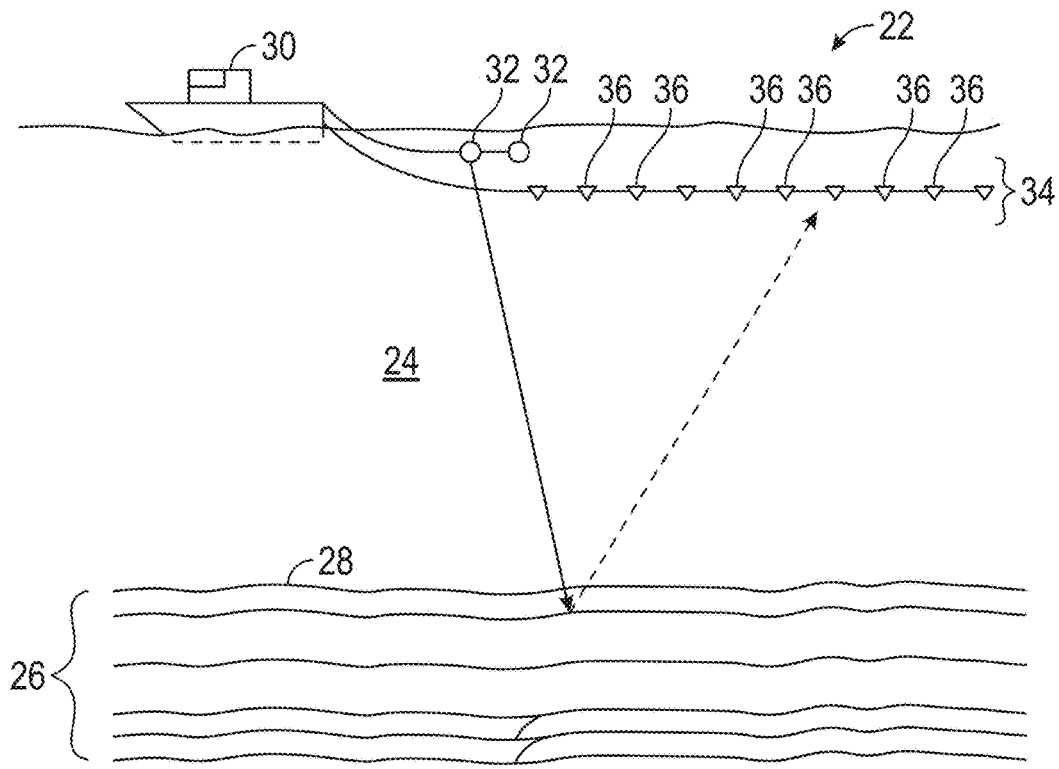
FIG. 2 is a schematic side view of an example marine survey system in a marine environment, in accordance with embodiments presented herein.
Figure 3:
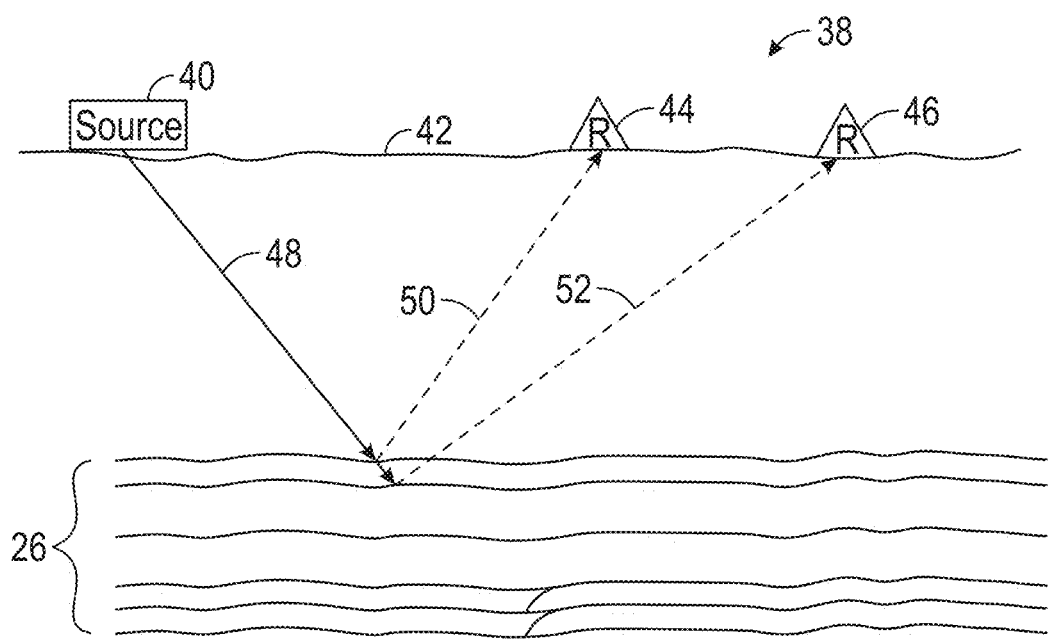
FIG. 3 is a schematic side view of an example land survey system in a non-marine environment, in accordance with embodiments presented herein.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via multiple sources and receivers or at different times may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and so forth. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region. For instance, the acts represented by block 12 may also include obtaining and analyzing additional seismic data, for example at a later point in time, to evaluate changes in a given sub-surface reservoir (e.g., based on velocity perturbation estimation) for more efficient recovery of hydrocarbons.

With the forgoing in mind, FIG. 2 illustrates a marine survey system 22 (e.g., for use in conjunction with block 12 of FIG. 1) that may be employed to acquire seismic data regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within the subsurface region 26 of the Earth. The vessel 30 may tow the seismic source 32 (e.g., airgun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations within the subsurface region 26. Although the receiver 36 is described as being towed by the vessel 30, in some embodiments, receiver 36 may also be deployed on the surface of the seafloor 28. Additionally, although the description of the marine survey system 22 is described with one seismic source 32 (represented in FIG. 2 as an airgun array) and one receiver 36 (represented in FIG. 2 as a plurality of hydrophones), it should be noted that the marine survey system 22 may include multiple seismic sources 32 and multiple seismic receivers 36. In the same manner, although the marine survey system 22 is described above with respect to one seismic streamer 34, it should be noted that the marine survey system 22 may include multiple seismic streamers 34. In addition, additional vessels 30 may include additional sources 32, streamers 34, and the like to perform the operations of the survey system.

FIG. 3 illustrates an embodiment of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 positioned on a surface 42 of the Earth, and one or more land-based receivers 44 also positioned on the surface 42 (or other appropriate location). In some embodiments, the land survey system 38 may include more than one seismic source 40 and first and second receivers 44 and 46. Indeed, for discussion purposes, FIG. 3 includes one land-based seismic source 40 and two seismic receivers 44 and 46. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations (e.g., interfaces between different formation materials) and acquired or recorded by one or more land-based receivers (e.g., 44 and 46) as raw signals.

In some embodiments, the land-based receivers 44 and 46 may be dispersed across the surface 42 to form a grid-like pattern. As such, each land-based receiver 44 or 46 may receive a signal corresponding to a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as a seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a first reflected seismic waveform 50 and the second receiver 46 may receive a second reflected seismic waveform 52.

The received data for each of these channels (the first and second receivers 44, 46) may be processed to produce a collection of seismic traces. The collection of seismic traces over all the receivers used by the system 38 at a given time (e.g., a first time period) may be referred to as the set of traces corresponding to a given seismic survey. Seismic surveys may be conducted at different points in time to evaluate changes in the sub-surface reservoir.

Figure 4:
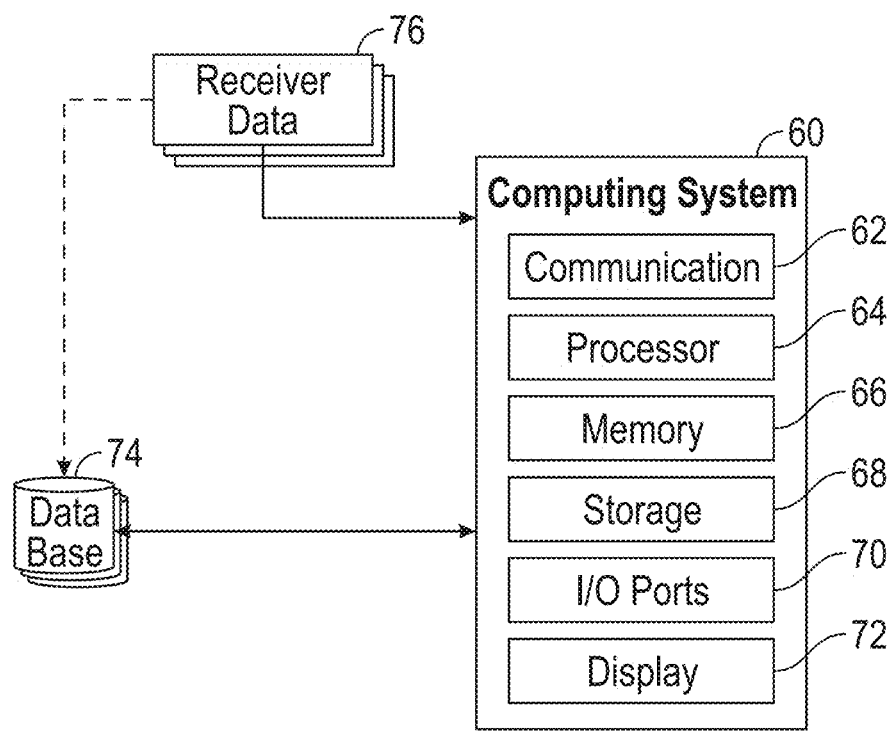
FIG. 4 is a diagrammatical representation of an example computing system that performs operations described herein based on data acquired via the marine survey system of FIG. 2 or the land survey system of FIG. 3, in accordance with embodiments presented herein.

Regardless of how the seismic data is acquired, a computing system (e.g., for use in conjunction with block 12 of FIG. 1) may analyze the signals (seismic waveforms) acquired by the marine-based receivers 36 or the land-based receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of and/or evaluate changes in the geological formations within the subsurface region 26. Indeed, as discussed herein, the computing system 60 of the present disclosure is programmed to perform the seismic survey adjustments, seismic trace inversions, and analyses described herein.

Referring now to FIG. 4, the computing system 60 may include a communication component 62, a processor 64, a memory 66, a storage 68, input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., signals, seismic data, seismograms, seismic traces) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic system according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may allow the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display component 72 since multiple display components 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, seismic traces, and the like generated from surveying the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits, as well as changes occurring over time in the subsurface region 26 (e.g., due to hydrocarbon production). A variety of seismic data processing algorithms may be stored and executed by the computing system 60 to, for instance, remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

Figure 5:
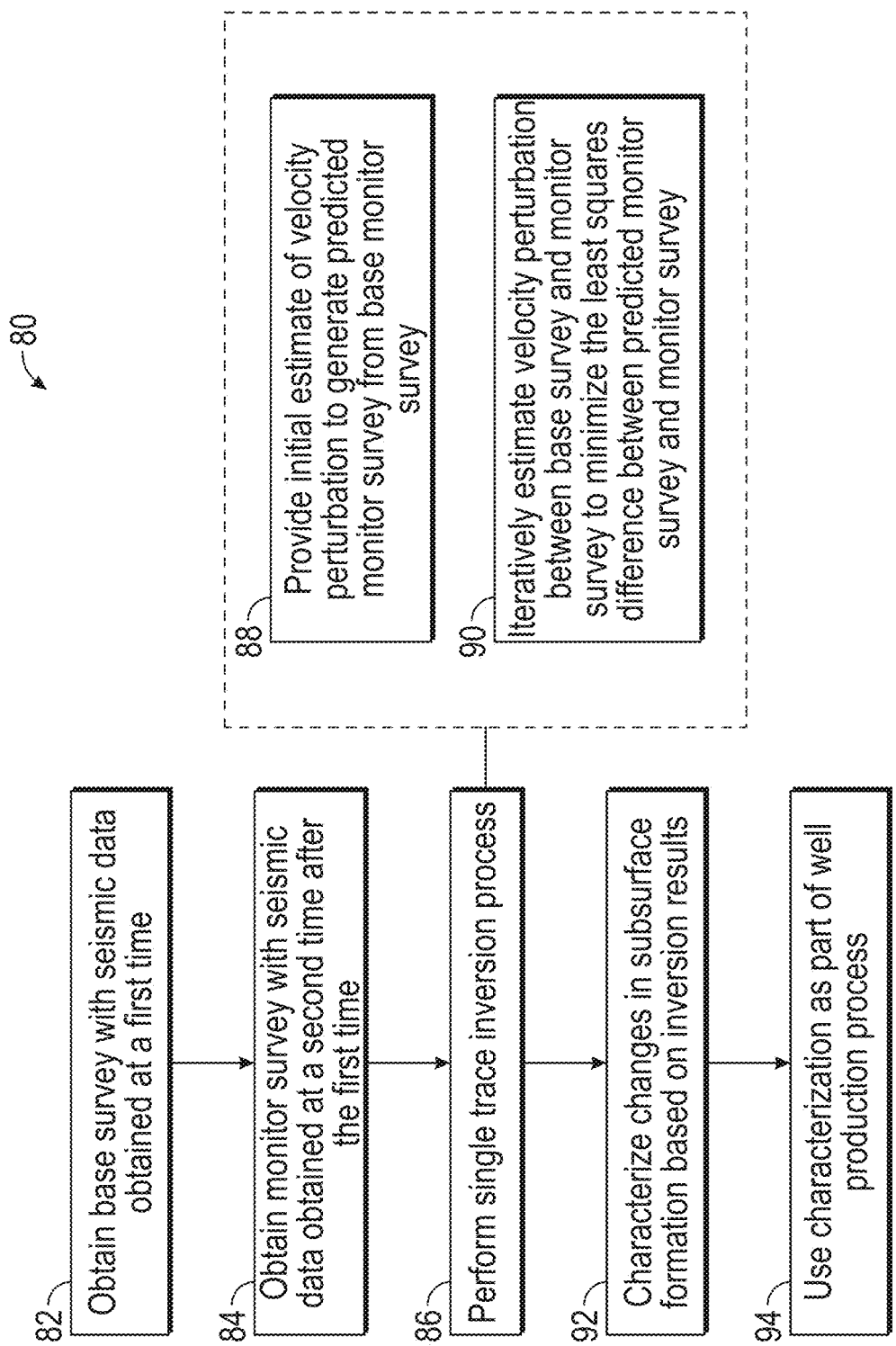
FIG. 5 is a process flow diagram of an embodiment of a method of characterizing evolution in a subsurface region by way of single trace inversion performed on a 4D seismic data set, in accordance with embodiments presented herein.

Using any one or a combination of the systems described above with respect to FIGS. 2-4, it is now recognized that it may be possible to perform methods of single trace inversion to estimate velocity perturbations for a 4D seismic data set. The 4D seismic data set generally includes at least two 3D seismic data sets from two time points of the same field of observation. FIG. 5 depicts an embodiment of a method 80 of performing single trace inversion to estimate velocity perturbation, and thereafter characterize a subsurface region of the Earth using the estimates. By way of example, the method 80 may be performed in part or in full by the computing system 60 of FIG. 4.

The method 80 generally includes obtaining a 4D seismic data set of a subsurface region—specifically illustrated as obtaining (block 82) a base survey with seismic data obtained at a first time and obtaining (block 84) a monitor survey with seismic data obtained at a second time after the first time. As an example, the base survey may be conducted before hydrocarbon production from a subsurface region, and the monitor survey may be conducted after some amount of hydrocarbon production has been performed. However, the present disclosure is not limited to such situations, and the base and monitor surveys may be conducted at any of at least two different time points with respect to the production of hydrocarbons from the subsurface region.

As discussed herein, the seismic data obtained for the base and monitor surveys generally includes acquiring and/or processing the seismic data to produce a series of seismic traces. That is, the base seismic survey is associated with a set of base seismic traces and the monitor seismic survey is associated with a set of monitor seismic traces. It should be noted that obtaining such data in accordance with blocks 82 and 84 may involve performing the measurements themselves (e.g., transmitting waveforms into the subsurface region and collecting resulting waveforms), or, in some instances, may involve accessing the data (e.g., using the computing system 60) from the database 74. Further still, in certain embodiments, the acts of blocks 82 and 84 may simply represent receiving acquired base and monitor seismic data. The base seismic traces and the monitor seismic traces are generally representative of geological characteristics of the subsurface region at the time their respective surveys are acquired. More specifically, the seismic traces represent the manner in which a seismic waveform is perturbed from its original state due to changes in reflection coefficient as the waveform travels along a subsurface path from source to detector. The changes in reflection coefficient generally relate to changes in the material through which the seismic waveform passes, or interfaces where the wavelet partially reflects or refracts.

Thus, in accordance with present embodiments, the acts represented by blocks 82 and 84 may produce base seismic traces and monitor seismic traces. As set forth above, the present disclosure includes a method of single trace inversion, where individual base seismic traces are modified to produce corresponding estimated monitor seismic traces. The difference between the corresponding estimated monitor seismic traces and the monitor seismic traces is then minimized, until a threshold is reached, to produce a series of estimated velocity perturbations for the subsurface region.

Referring again to the method 80, the acts represented by blocks 82 and 84 are thus followed by a process in which the computing system 60 performs single trace inversion (block 86), which is described in further detail below. The output of the computing system 60, upon performing the single trace inversion process, may include, by way of non-limiting example, a series of estimated velocity perturbations for each base seismic trace and a corresponding monitor seismic trace.

In this way, the base seismic survey includes a multitude of such base seismic traces, and the monitor seismic survey includes a multitude of such monitor seismic traces. In certain embodiments, the base seismic survey and the monitor seismic survey are generally performed in the same manner, such that the sources and detectors used for the surveys are generally positioned at the same location on the ground (e.g., with respect to the subsurface region of interest). If they are not positioned at generally the same location, methods exist in the art that may allow the computing system 60 to perform corrective alignment techniques to allow the base and monitor seismic surveys to be compared.

Regarding the single trace inversion process performed by the computing system 60, each base seismic trace may be represented by a series of amplitude values as a function of time, b(t), and the monitor seismic trace may have a similar corresponding representation m(t). The number of amplitude values for the base and monitor seismic traces is variable depending, specifically, on the sampling rate used to acquire the traces and the overall acquisition time. Thus, the base seismic trace b(t) may be considered to include a number of different amplitude values $b(t_i)$, where $b(t_i)$ is an amplitude value for the base seismic trace at a particular sampling time $t_i$. The monitor seismic traces are similarly represented (by m($t_i$)) and, thus, there are acquisition time-corresponding points $t_i$ for the base seismic trace and the monitor seismic trace.

Further, each base seismic trace will have a single corresponding monitor seismic trace. That is, for each base seismic trace b(t) there is a monitor seismic trace m(t) that corresponds in position to that base seismic trace. Differences between corresponding base and monitor traces that may be considered by the computing system 60 may include, by way of non-limiting example, waveforms that appear to have different peaks, corresponding peaks that have different amplitudes, and corresponding peaks that occur at different time points with respect to the acquisition time of the respective trace (e.g., one trace appears to be time-shifted with respect to the other). Such differences may be further appreciated with respect to the base seismic trace and monitor seismic trace shown as the outermost traces described in further detail below with respect to FIG. 6. Comparison between these two traces, for example on a point-wise or even a cumulative basis by the computing system 60, may allow evaluation of changes occurring in the subsurface region under study.

In accordance with present embodiments, the process of single trace inversion in accordance with block 86 may be performed via a process where the computing system 60 accounts for changes between a particular base seismic trace and its corresponding monitor seismic trace according to a time shift in amplitude values as well as amplitude changes, both of which may be expressed as resulting from velocity perturbations. These velocity perturbations are then used by the computing system 60 to evaluate changes in the subsurface region.

Present embodiments utilize a relationship relating to the impedance of a wavelet as it propagates through the ground. Specifically, the impedance perturbation $$\frac{\Delta Ip}{Ip}$$

between the base seismic trace and a corresponding monitor seismic trace may be represented as an approximative function of the sum of density perturbation $$\frac{\Delta \rho}{\rho}$$

and velocity perturbation $$\frac{\Delta v}{v}:$$

$$\frac{\Delta Ip}{Ip} \approx \frac{\Delta v}{v} + \frac{\Delta \rho}{\rho}$$

where $$\frac{\Delta Ip}{Ip}$$

is $$\frac{Ip_b - Ip_m}{Ip_b},$$

$Ip_b$ is the impedance at a time point for the base seismic trace, and $Ip_m$ is the impedance at the time-corresponding point for the monitor seismic trace $$\frac{\Delta v}{v}$$

is $$\frac{v_b - v_m}{v_b} \text{ and } \frac{\Delta \rho}{\rho}$$

is $$\frac{\rho_b - \rho_m}{\rho_b}.$$

$v_b$ is the velocity at a time point for the base seismic trace, and $v_m$ is the velocity at the time-corresponding point for the monitor seismic trace; $\rho_b$ is the density at a time point for the base seismic trace, and $\rho_m$ is the density at the time-corresponding point for the monitor seismic trace.

Present embodiments of the computing system 60 establish an approximate relationship between the velocity perturbation and the density perturbation according to the following equation:

$$\frac{\Delta \rho}{\rho} \approx \alpha \left( \frac{\Delta v}{v} \right)$$

where $\alpha$ may be considered a scalar. If $\alpha=0$, then velocity perturbation is the main reason for the impedance change from the base seismic trace to the monitor seismic trace. However, even in situations where density perturbation is responsible for impedance changes, the difference between the base and monitor traces may be expressed in terms of velocity perturbation only, with the density perturbation being handled by the computing system 60 via different values of the scalar $\alpha$ in a manner described below.

The computing system 60 minimizes the difference between the base and monitor seismic traces by, for example, performing least squares minimization of the following objective function:

$$2C = \sum_{i=1}^{N} \{m(t_i) - \{b(\tilde{t}_i) + [\psi^* \Delta R(\tilde{t}_i)]_i\}\}^2$$

where the function is the sum, over all sampled points (i=1 through N), of the square of the difference between the amplitude values for the monitor seismic trace m($t_i$) and the amplitude values of a predicted monitor trace {b($\tilde{t}_i$)+[$\psi^* \Delta R$($\tilde{t}_i$)]$_i$}. This predicted monitor trace can be generated from the base seismic trace, and the predicted monitor trace can be generated based on an estimated velocity perturbation. More specifically, the first term of the predicted monitor trace, $b(\tilde{t}_i)$, represents an amplitude value for the base seismic trace at a time-shifted time point $\tilde{t}_i$, where the computing system 60 applies the time shift as follows:

$$\tilde{t}_i = t_i - dt \sum_{j=1}^{i} \gamma_j$$

where the time-shift is represented as a cumulative function of velocity perturbation from the first time sample point in acquiring the base seismic trace, j=1, to the respective time point i. In this equation, $\gamma_j$ is the velocity perturbation $$\frac{\Delta v}{v},$$

and dt represents the time in between each sample point (i.e., the sampling interval, which is determined by the sampling rate). Thus, when the computing system 60 calculates the time-shift at a given time point, a new time for that point is output. With a conventional method of hydrocarbon production, the velocity becomes slower from the base seismic trace to the monitor seismic trace, and therefore the time shift is usually positive. When the computing system 60 applies a time shift to a point of the base seismic trace, this may be referred to as a time-shifted point, and when the computing system 60 applies the time shifts to the points of the base seismic trace, the trace itself is referred to as being time-shifted.

The second term of the predicted monitor trace, $[\psi * \Delta R (\tilde{t}_i)]_i$ corresponds to an amplitude change that the computing system 60 applies to the time-shifted base seismic trace at time point i. In accordance with present embodiments, the computing system 60 time-shifts this amplitude change so that the amplitude changes are applied properly to the time-shifted base seismic trace. Here, $\psi$ is an estimated wavelet, such as a Ricker wavelet, that is used by the computing system 60 to estimate the wavelet produced by the seismic source. Other wavelets may be used as appropriate, and various methods for estimating wavelets are well known. It has been found that in certain embodiments, wavelet amplitude and phase within 20% of truth is acceptable for the objective function.

The computing system 60 convolves the wavelet $\psi$ with $\Delta R (\tilde{t}_i)$, which is a local reflection coefficient change associated with time point i of the time-shifted base seismic trace. Specifically, while the base seismic trace would be represented by the reflection coefficient convolved with the wavelet, here, the change from the base to the monitor is represented by the change in reflection coefficient convolved with the estimated wavelet.

In embodiments where the computing system 60 determines that the velocity perturbation is the main reason for the impedance change from the base to the monitor, for example by running a program stored on the memory 66, the computing system 60 may consider the local change in reflection coefficient in terms of velocity perturbation as follows:

$$\Delta R_i|_{i+1 <= N} = \tfrac{1}{2}(\gamma_{i+1} - \gamma_i)$$

where $$\Delta R_N = 0,$$

$\gamma_{i+1}$ represents the velocity perturbation at a time point sampled immediately after the time point i (after the sampling interval has passed), and $\gamma_i$ is the velocity perturbation at the time point i. Thus, the local reflection coefficient change for the time point i is proportional to its local change in velocity perturbation. Situations where density perturbation is identified by the computing system 60 as non-negligible are discussed in further detail herein.

In accordance with present embodiments, the computing system 60, in performing the single trace inversion process, may account for density perturbation in certain circumstances using a scalar based on the assumption that $$\frac{\Delta \rho}{\rho} \approx \alpha \left(\frac{\Delta v}{v}\right)$$

where the scalar $\alpha$ may be chosen depending on the percentage density perturbation in the impedance perturbation from base to monitor. Based on the above assumption, the scalar $\alpha$ is incorporated by the computing system 60 into the objective function according to the following equation:

$$\Delta R_i|_{i+1 <= N} = \frac{1+\alpha}{2}(\gamma_{i+1} - \gamma_i)$$

where, again, $\gamma$ is velocity perturbation. The circumstances where the scalar may be appropriate include situations where the relationship between velocity perturbation and the density perturbation are roughly linear.

Thus, one or more embodiments of the computing system 60 may express the objective function as a function of a single type of variable—velocity perturbation. Accordingly, initial operations performed by the computing system 60 as a part of the single trace inversion process of block 86 may include providing an initial estimate of velocity perturbations (block 88). The initial estimates may be made, for example, based on previously generated models (e.g., previously generated velocity models) relating to the subsurface region. However, present embodiments are not limited to such methods for estimation, and the velocity perturbations may be initially estimated by the computing system 60 in any suitable manner.

Once the computing system 60 generates an initial estimate for velocity perturbation in accordance with block 88, the computing system 60 generates an initial predicted monitor trace, and calculates the difference 2C (or variations thereof, such as C) according to the objective function. In response to determining that the difference is greater than a convergence threshold, the computing system 60 iteratively estimates the velocity perturbation (block 90). The computing system 60 may perform this process until the difference C is below a predetermined threshold. In performing the acts of blocks 88 and 90, the computing system 60 may linearize a gradient associated with the objective function using linear interpolation to determine the manner in which the velocity perturbations should be changed. The performance of the linearized gradient may improve with finer sampling rates (e.g., 1 ms sample interval). In response to determining that the objective function has reached a value of C that is at or below the predetermined threshold, the computing system 60 (performing method 80) may be considered to have produced "final" estimated velocity perturbations, meaning that no further iterations are required.

The computing system 60 may produce a number of different outputs using the velocity perturbations generated by the single trace inversion process of block 86, for example to aid in determining how the subsurface region may be evolving. For instance, the computing system 60 may utilize the output velocity perturbations to characterize (block 92) evolution in the subsurface region by generating a 3D map of velocity perturbation or velocity of the subsurface region, or by updating existing velocity, impedance, density, or other models. The computing system 60, for example in addition to the systems depicted in FIGS. 2 and/or 3, may also use the characterization as a part of the production process (block 94).

Figure 6:
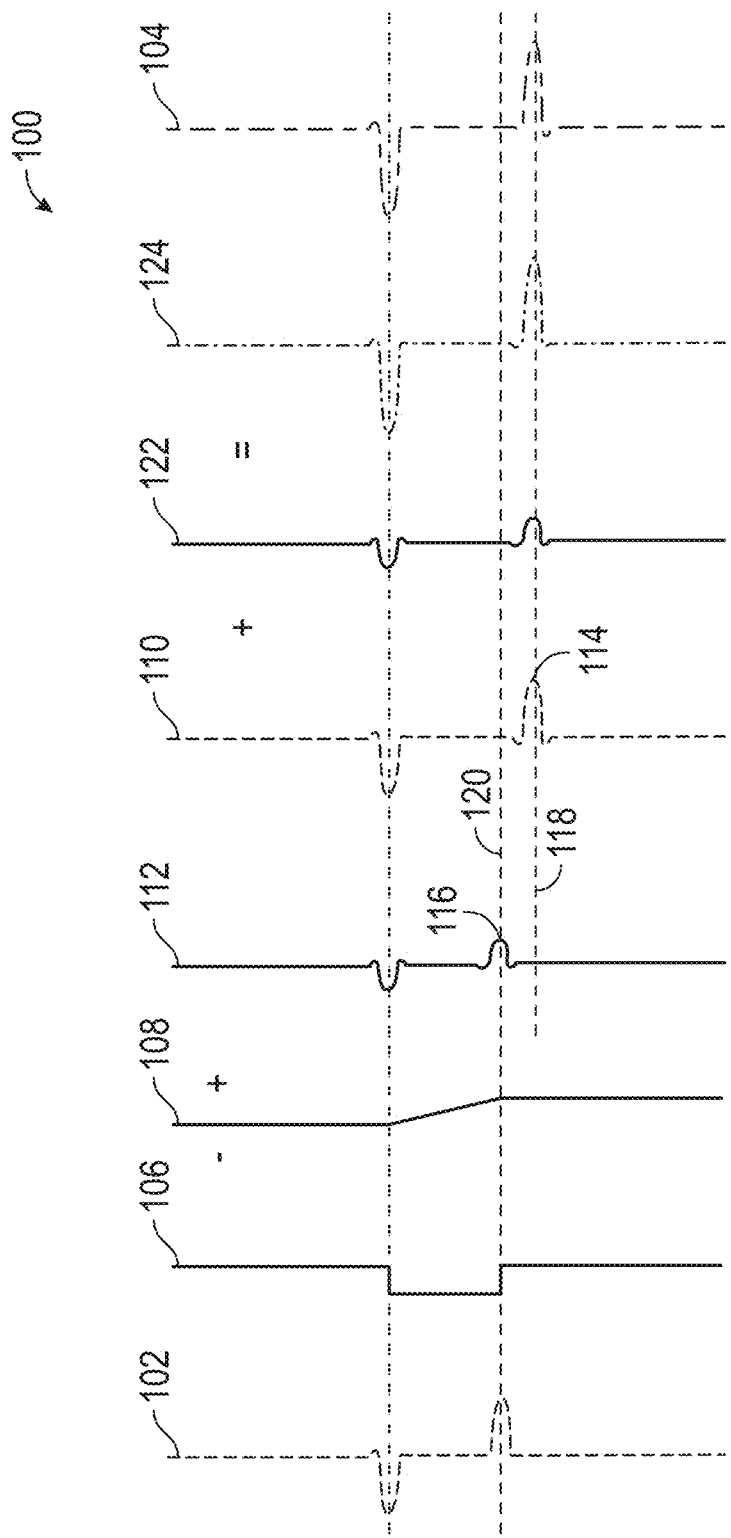
FIG. 6 is a schematic overview of an example of the manner in which an objective function of the present disclosure operates to produce a predicted monitor trace from a base seismic trace using estimated velocity perturbation, in accordance with embodiments presented herein.

FIG. 6 is a plot 100 of various functions that demonstrate the manner in which the objective function, run by the computing system 60, may be considered to operate in the time domain. Specifically, the plot 100 shows the functions as being plots of various types of values as a function of time, where negative values for each trace are shown as being toward the left, and positive values for each trace are shown as being toward the right. In the plot 100, a base seismic trace 102 and a monitor seismic trace 104 corresponding to the base seismic trace 102 are shown as being amplitude functions of time (waveforms). As set forth above, the monitor seismic trace 104 corresponds to the base seismic trace 102 because the monitor seismic trace 104 was obtained by transmitting a seismic waveform through the subsurface region at the same position of earth as the base seismic trace 102.

The objective function, generally, begins with the base seismic trace 102 as the "reference" trace. A velocity perturbation function 106 is defined (e.g., estimated) by the computing system 60, either as a series of discrete velocity perturbation values based on previously obtained velocity models, or may be modeled by the computing system 60 as a function (e.g., an equation). In the example shown in FIG. 6, the velocity perturbation function 106 is approximated by a square wave function and is $$\frac{\Delta v}{v}$$

as a function of time.

In FIG. 6, because the base seismic trace 102 is being shifted toward (i.e., being transformed toward) resembling the monitor seismic trace 104, the velocity perturbation function 106 includes negative velocity perturbation values, which indicates that the seismic waveform used to generate the monitor seismic trace travels through the subsurface region with a slower velocity than the seismic waveform used to generate the base seismic trace.

The computing system 60 generates a time shift function 108 via the objective function based on the estimated velocity perturbation function 106. More specifically, the computing system 60 may generate the time shift function 108 as a scaled summation of velocity perturbation by the sampling rate. As shown, the time shift trends toward a positive value over time, meaning that the time points of the base seismic trace 102 that occur later during the acquisition period are shifted such that they appear to have been acquired at an even later time. The result of applying the time shift is demonstrated by a time-shifted base seismic trace 110. The points of the time-shifted base seismic trace 110 are b($\tilde{t}_i$) in the objective function.

As set forth above, there are generally two assumed changes that occur between the base seismic trace 102 and the monitor seismic trace 104—a time shift (or a change in propagation time for the seismic wavelet used to obtain the traces) and an amplitude change. The amplitude change from base to monitor, which again is an estimated wavelet convolved with a change in reflection coefficient, is shown as an amplitude change function 112. However, it will be appreciated with reference to FIG. 6 that if the amplitude change function 112 is used to modify the time-shifted base seismic trace 110, there will be a misalignment of a peak 114 of the trace 110 with an amplitude change peak 116 of the amplitude change function 112. This occurs because the peak 114 occurs at a shifted time 118, while the amplitude change peak 116 of the amplitude change function 112 has not been shifted and remains at an unshifted time 120.

Returning to FIG. 6, in accordance with present embodiments, the computing system 60 applies the time shift function 108, via the objective function, to the amplitude change function 112 to generate a time-shifted amplitude change function 122. Applying the time shift to the amplitude change in this manner ensures that the amplitude change is properly applied to the time-shifted base seismic trace 110. The objective function represents values of the time-shifted amplitude change function 122 as $[\psi^*\Delta R(\tilde{t}_i)]_i$. In this respect, the objective function combines the time-shifted amplitude change 122 and the time-shifted base seismic trace 110 to produce a predicted monitor trace 124.

It should be noted that while the present disclosure primarily relates to the shifting of a base seismic trace to match a corresponding monitor seismic trace, the present disclosure is not necessarily limited to this arrangement. In particular, the base seismic trace is chosen as the trace to shift largely because the base seismic volume generally has a shallower reservoir bottom compared to the monitor seismic volume. Indeed, it has been found that linear interpolation works better to calculate the inversion gradient and perform the inversion when a relatively fine sampling rate is used (e.g., 1 ms), and when the time shift from velocity perturbation will shift the reservoir bottom deeper.

As set forth above, the computing system 60 may use the estimated velocity perturbations produced by the single trace inversion method in a number of ways. As one specific example, the computing system 60 may apply the estimated velocity perturbation to a velocity model of the subsurface for the base survey to produce an estimated or "updated" velocity model of the subsurface for the monitor survey. Further, it should be noted that the single trace inversion methods performed by the computing system 60 may be used not only in situations where the time shift is small (e.g., less than 2 sampling intervals), but also in situations where time shifts are relatively large (e.g. 2 or more sampling intervals). Indeed, in situations where time shifts are relatively large, it is presently recognized that it becomes even more important for the computing system 60 to apply the time shift upon the amplitude change, in addition to applying the time shift upon the reference trace (e.g., the base seismic trace).

Figure 7A:
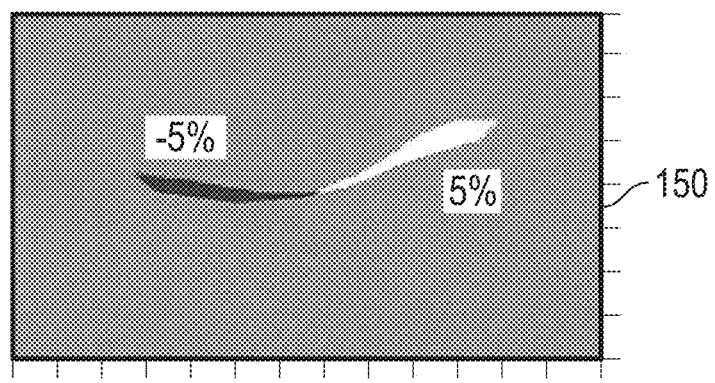
FIGS. 7A-7C illustrate a comparison between a true velocity model and velocity models produced according to the single trace inversion techniques of the present disclosure, in accordance with embodiments presented herein.
Figure 7B:
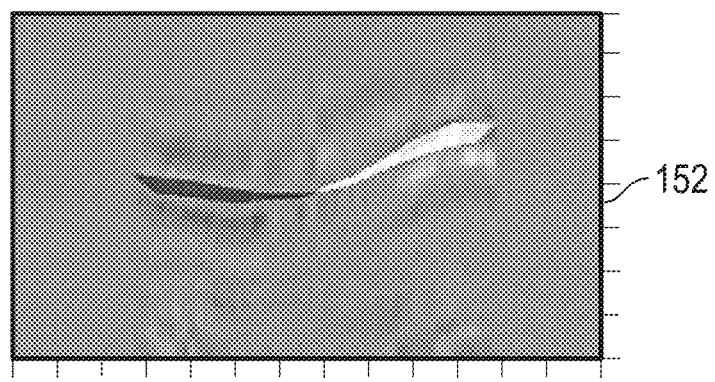
Figure 7C:
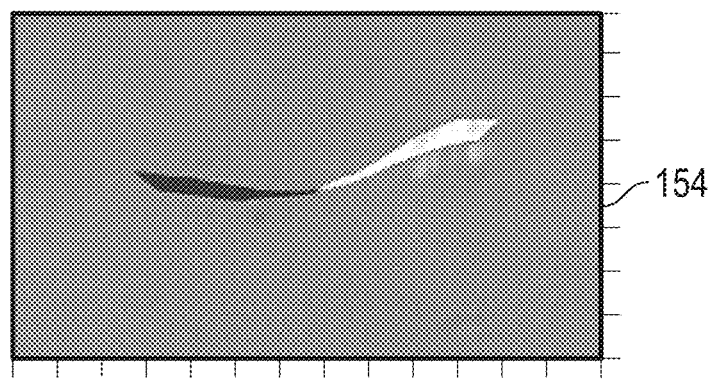

FIGS. 7A-7C, for instance, demonstrate the accuracy of the single trace inversion method described herein for situations where the time shift is relatively small. FIG. 7A includes a true model of velocity perturbation 150 occurring between velocity models of a synthetic base survey and a synthetic monitor survey of a subsurface region, where the horizontal axis corresponds to position along a seismic block and the vertical axis corresponds to time. The true model of velocity perturbation 150 reflects the actual (i.e., ground truth) amount of velocity perturbation between velocity models of the synthetic base survey and the synthetic monitor survey (i.e., an amount of velocity change imposed between the synthetic base survey and the synthetic monitor survey).

The velocity models were generated using the Data Dictionary System (DDS) input/output (I/O) system offered by BP America Inc. Such models may be referred to as "2D synthetics." The true model of velocity perturbation 150 includes relatively constant velocity changes represented by a ribbon-like shape. On the left side of the ribbon shape, velocity changes are a relatively constant −5%, and on the right side of the ribbon shape, velocity changes are a relatively constant +5%.

FIG. 7B is a raw inversion output 152 of the single trace inversion process of one or more embodiments described herein. In particular, FIG. 7B is a raw output of the single trace inversion process, as described for example with respect to block 86 of FIG. 5, applied to the synthetic base survey and the synthetic monitor survey to calculate velocity changes between the synthetic base and monitor surveys. As shown, the raw inversion output 152, without further processing is generally in agreement with the true model of velocity perturbation 150. The accuracy of the present embodiments may be further appreciated with reference to FIG. 7C, which is a regularized inversion output 154 corresponding to regularization applied to the raw inversion output 152. As shown in FIG. 7C, the modeled velocity perturbations are in further agreement with the true model of velocity perturbation 150 after artifacts are removed via regularization.

Figure 8A:
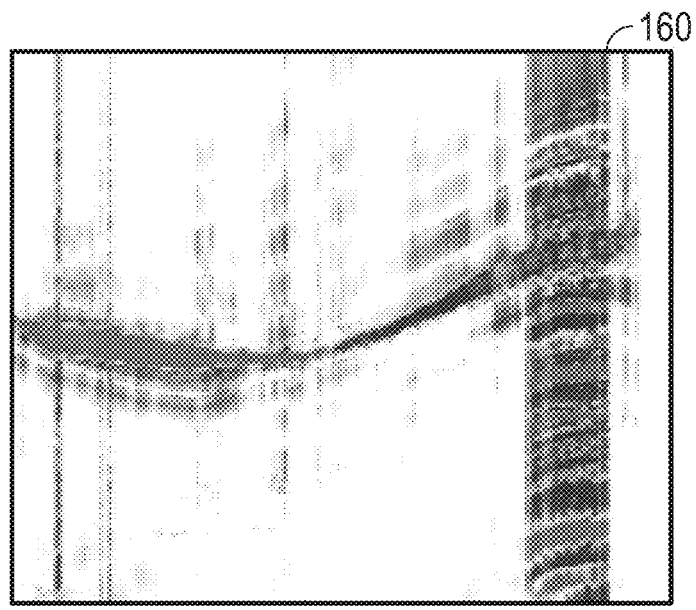
FIGS. 8A and 8B illustrate a comparison between velocity models where amplitude change is not time shifted and where amplitude change is time shifted, in accordance with embodiments presented herein.
Figure 8B:
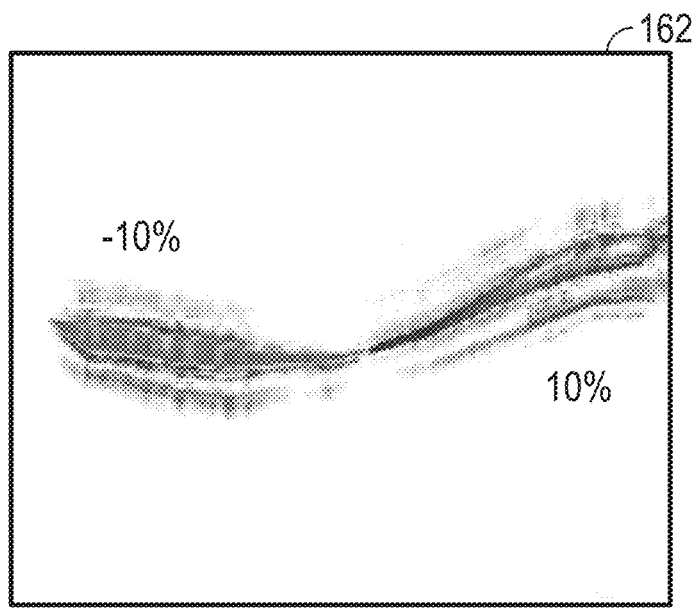

FIGS. 8A and 8B depict velocity change models for base and monitor synthetics generated in a similar manner as described above with respect to FIGS. 7A-7C. More specifically, FIGS. 8A and 8B provide a visual comparison of inversion results when a time shift is not applied to the amplitude change of the objective function (corresponding to an unshifted inversion output 160 as shown in FIG. 8A) versus when a time shift is applied to the amplitude change of the objective function (corresponding to a shifted inversion output 162 as shown in FIG. 8B). As shown, when the time shift from base to monitor is relatively large (e.g., 2 or more sampling intervals), significant error is introduced to the model when a time-shift is not applied to the amplitude change. Both models are shown without regularization, and it was determined that the shifted inversion output 162 has the same reservoir thickness in time as the real model.

As set forth above, in certain embodiments it may be assumed that, for the purposes of performing the single trace inversion process of the present disclosure, density perturbation is negligible because velocity perturbation is the main change in the reservoir from base to monitor. As one example, if, as a result of hydrocarbon production, there is a relatively small amount of gas coming out of solution, the predominant change will be in velocity. However, in other cases, density perturbation will have a non-negligible effect. Indeed, it is now recognized that the percentage error in impedance perturbation estimation increases exponentially with the percentage contribution of density perturbation to impedance perturbation. Accordingly, as previously described, the computing system 60 may account for the density perturbation using the scalar α, which may be chosen depending on the percentage density perturbation in the impedance perturbation from base to monitor. The circumstances where the scalar may be appropriate include situations where the relationship between velocity perturbation and the density perturbation are roughly linear.

Figure 9:
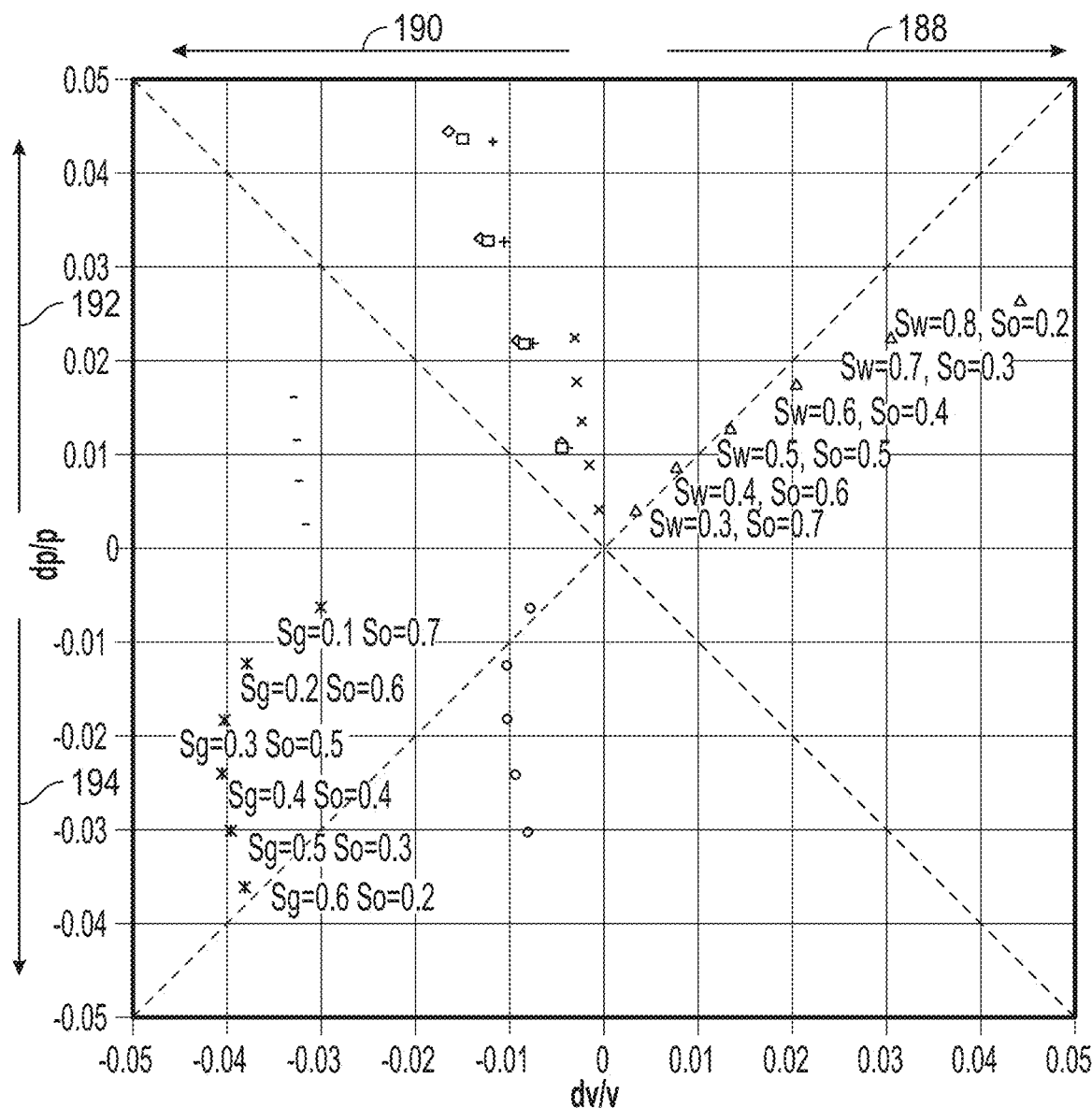
FIG. 9 is a plot of density perturbation and velocity perturbation as a function of reservoir materials, in accordance with embodiments presented herein.

FIG. 9 is an example plot 170 of how the materials in a formation may affect density and velocity perturbation, and their relationship, for an example reservoir. As shown in FIG. 9, there are a number of scenarios shown in the legend that serve as examples of processes that may be observed between the time when the base and monitor surveys are performed. Specifically, the legend includes a first scenario 172, a second scenario 174, a third scenario 176, a fourth scenario 178, a fifth scenario 180, a sixth scenario 182, a seventh scenario 184, and an eighth scenario 186. These scenarios are accompanied by example water, oil, and/or gas saturation values (Sw, So, and Sg, respectively). It should be noted that in the example plot 170 of FIG. 9, it is assumed that pressure remains relatively constant.

The four quadrants depicted in the plot 170 are divided according to the presence of gas, and whether water or gas is being injected. Specifically, with respect to the presence of gas in the reservoir, a first trend line 188 corresponds to no gas being present in the reservoir, and a second trend line 190 corresponds to gas being present in the reservoir. The first and second trend lines 188, 190 correspond to positive velocity perturbation values and negative velocity perturbation values, respectively. With respect to fluid injection into the reservoir, a third trend line 192 corresponds to the injection of water into the reservoir, and a fourth trend line 194 corresponds to the injection of gas into the reservoir. The third and fourth trend lines 192, 194 correspond to positive density perturbation values and negative density perturbation values, respectively.

For the first, second, third, and eighth scenarios 172, 174, 176, 186, the density increases as water is introduced, and the velocity perturbation is negative because the impedance change is largely determined by the density change. More specifically, the fluid bulk modulus, K, is mostly determined by the gas bulk modulus, and the p-wave velocity Vp relates to the fluid bulk modulus according to the following equation:

$$Vp = \left(\frac{K}{\rho}\right)^{0.5}$$

where K will generally not change by an appreciable amount, but because the density ρ increases, the fluid Vp will decrease. The rock Vp will also decrease accordingly—with the decrease in Vp leading to a negative velocity perturbation.

Figure 10:
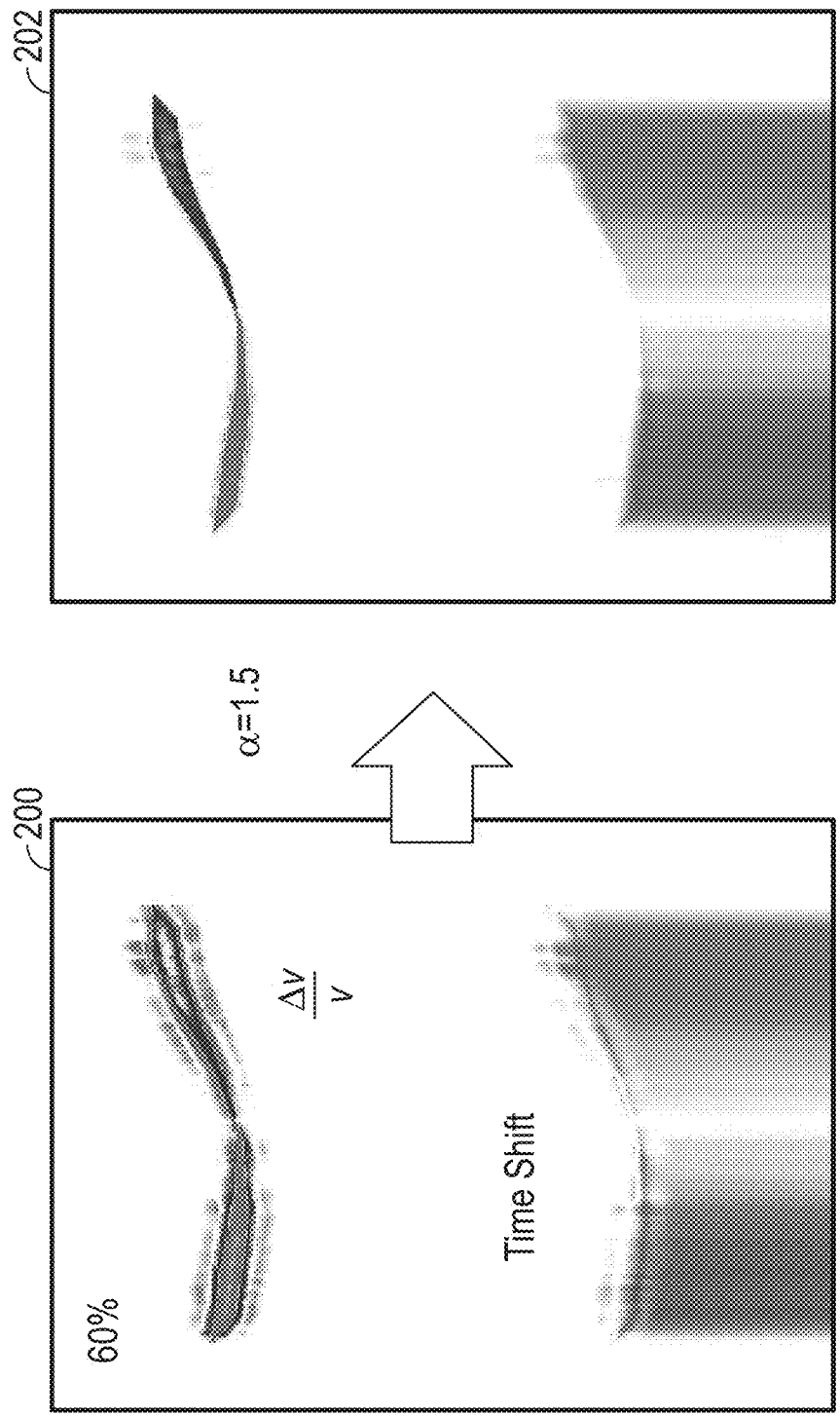
FIG. 10 is a comparison between example inversion results, the results being produced by an objective function where a scalar is not used to account for density perturbation, and by an objective function where a scalar is used to account for density perturbation, in accordance with embodiments presented herein.

FIG. 10 provides example inversion results produced by the objective function when the density perturbation accounts for 60% of the impedance perturbation. More specifically, the left diagram is a set of first inversion results 200, and demonstrates that when the computing system 60 does not use the scalar α to account for density perturbation, there is clearly error in both the velocity perturbation and the time shift produced by the objective function. However, when the computing system 60 applies the appropriate value for the scalar α, in this example a value of 1.5, the velocity perturbation and time shift inversion results are clearly more precise as shown in the set of second inversion results 202.

In this respect, the 4D joint inversion process performed by the computing system 60 may be considered an "adaptive" technique by incorporating the ability to adjust the scalar parameter to account for varying degrees of density perturbation without incorporating an additional variable into the objective function. Example values for the scalar are presented in Table 1 below.

According to the embodiment of Table 1, the three zones of a velocity perturbation (dv/v) and density perturbation (dρ/ρ) crossplot, such as the crossplot shown in FIG. 9, are equally divided according to angle. The values of alpha corresponding to angles below 180 degrees would be used in a pool for inversion. It should be noted that certain of the values are outliers. For example, the values at 90 degrees and 270 degrees are not realistic, and the value at 180 degrees corresponds to negligible contribution from density perturbation.

TABLE 1

Example values for α

| Angle (Degree) | dρ/ρ | dv/v | α |
|---|---|---|---|
| 0 | 0 | 1 | 0.00 |
| 10 | 0.173648175 | 0.984807754 | 0.18 |
| 20 | 0.342020138 | 0.939692623 | 0.36 |
| 30 | 0.499999992 | 0.866025408 | 0.58 |
| 40 | 0.642787601 | 0.766044451 | 0.84 |
| 50 | 0.766044434 | 0.642787621 | 1.19 |
| 60 | 0.866025395 | 0.500000015 | 1.73 |
| 70 | 0.939692614 | 0.342020163 | 2.75 |
| 80 | 0.984807749 | 0.173648201 | 5.67 |
| 90 | 1 | 2.67949E−08 | |
| 100 | 0.984807758 | −0.173648148 | −5.67 |
| 110 | 0.939692632 | −0.342020113 | −2.75 |
| 120 | 0.866025422 | −0.499999969 | −1.73 |
| 130 | 0.766044468 | −0.64278758 | −1.19 |
| 140 | 0.642787642 | −0.766044416 | −0.84 |
| 150 | 0.500000039 | −0.866025381 | −0.58 |
| 160 | 0.342020188 | −0.939692604 | −0.36 |
| 170 | 0.173648228 | −0.984807744 | −0.18 |
| 180 | 5.35898E−08 | −1 | 0.00 |
| 190 | −0.173648122 | −0.984807763 | 0.18 |
| 200 | −0.342020087 | −0.939692641 | 0.36 |
| 210 | −0.499999946 | −0.866025435 | 0.58 |
| 220 | −0.64278756 | −0.766044485 | 0.84 |
| 230 | −0.766044399 | −0.642787662 | 1.19 |
| 240 | −0.866025368 | −0.500000062 | 1.73 |
| 250 | −0.939692595 | −0.342020213 | 2.75 |
| 260 | −0.98480774 | −0.173648254 | 5.67 |
| 270 | −1 | −8.03847E−08 | |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of characterizing changes in a hydrocarbon reservoir comprising:
   receiving a base seismic trace of a base seismic survey and a monitor seismic trace of a monitor seismic survey, the base seismic survey and the monitor seismic survey being associated with the hydrocarbon reservoir and taken at different respective times by applying a seismic waveform at approximately the same position on a ground leading to respective propagation paths for a seismic waveform through the ground at the different respective times;
   generating a predicted monitor seismic trace based on the base seismic trace and the monitor seismic trace, wherein generating the predicted monitor seismic trace from the base seismic trace comprises:
      estimating initial velocity perturbations occurring between the base seismic id the monitor seismic trace, the estimated initial velocity perturbations relating changes in velocity for the seismic waveform through the hydrocarbon reservoir;
      applying a time shift to the base seismic trace based on the estimated initial velocity perturbations; and
      compensating for amplitude changes between the base seismic trace and the monitor seismic trace, the time shift being applied to the amplitude changes to generate the predicted monitor seismic trace, wherein the base seismic trace, monitor seismic trace, and predicted monitor seismic trace are different seismic traces;
   minimizing, until a predetermined convergence is reached, a difference between the predicted monitor seismic trace and the monitor seismic trace by iteratively estimating the estimated initial velocity perturbations to obtain final estimated velocity perturbations; and
   producing a velocity perturbation map using at least the final estimated velocity perturbations, the velocity perturbation map indicating changes in geological characteristics of the hydrocarbon reservoir between the base seismic survey and the monitor seismic survey.

2. The method of claim 1, wherein compensating for amplitude changes between the base seismic trace and the monitor seismic trace comprises applying, to each sample point of the base seismic trace to which the time shift has been applied, an estimated wavelet convolved with a time-shifted local change in reflection coefficient.

3. The method of claim 2, wherein the time-shifted local change in reflection coefficient corresponds, for each sample point, to a difference in velocity perturbation between the respective sample point and an adjacent sample point on the base seismic trace.

4. The method of claim 3, wherein the adjacent sample point is a point sampled a single sampling interval after sampling the respective sample point.

5. The method of claim 4, comprising sampling the base seismic trace and the monitor seismic trace at a sampling interval of 1 millisecond (ms) or less.

6. The method of claim 3, wherein generating the predicted monitor seismic trace further comprises applying a scalar to the time-shifted local change in reflection coefficient based on an assumed linear relationship between a density perturbation between the base seismic trace and the monitor seismic trace and the velocity perturbation along with fluid change in the hydrocarbon reservoir.

7. The method of claim 6, wherein applying the scalar comprises determining a value of the scalar that is proportional to a percentage of impedance perturbation between the base seismic trace and the monitor seismic trace that is caused by the density perturbation.

8. The method of claim 1, comprising calculating the time shift as a scaled summation of velocity perturbation, the scaled summation being performed over sample points of the base seismic trace occurring from a first sample point of the base seismic trace to a respective sample point of the base seismic trace for which the time shift is being calculated.

9. The method of claim 1, wherein minimizing, until the predetermined convergence is reached, the difference between the predicted monitor seismic trace and the monitor seismic trace comprises minimizing a least squares difference between the predicted monitor seismic trace and the monitor seismic trace.

10. The method of claim 1, comprising estimating the estimated velocity perturbation γ according to the equation $$\gamma = \frac{\Delta v}{v}$$

wherein Δv is a difference between a velocity at a sample point of the base seismic trace and a velocity at a corresponding sample point of the monitor seismic trace, and v represents the velocity at the sample point of the base seismic trace.

11. A non-transitory, tangible, computer-readable storage medium, comprising instructions that, when executed by a processor, perform single trace inversion to characterize, at least in part, changes in a hydrocarbon reservoir, the instructions comprising instructions to:
receive a base seismic trace and a monitor seismic trace, the base seismic survey and the monitor seismic survey being associated with the hydrocarbon reservoir and taken at different respective times by applying a seismic waveform at approximately the same position on a ground leading to respective propagation paths for a seismic waveform through the ground at the different respective times;
generate a predicted monitor seismic trace based on the base seismic trace and the monitor seismic trace according to a routine comprising:
estimating initial velocity perturbations occurring between the base seismic id the monitor seismic trace, the estimated initial velocity perturbations relating changes in velocity for the seismic waveform through the hydrocarbon reservoir;
applying a time shift to the base seismic trace based on the estimated initial velocity perturbations;
compensating for amplitude changes between the base seismic trace and the monitor seismic trace, the time shift being applied to the amplitude change to generate the predicted monitor seismic trace, wherein the base seismic trace, monitor seismic trace, and predicted monitor seismic trace are different seismic traces; and
minimizing, until a predetermined convergence is reached, a difference between the predicted monitor seismic trace and the monitor seismic trace by iteratively estimating the estimated initial velocity perturbations to obtain final estimated velocity perturbations; and
characterize changes of at least part of the hydrocarbon reservoir using the final estimated velocity perturbations.

12. The non-transitory, tangible, computer-readable storage medium of claim 11, wherein compensating for amplitude changes between the base seismic trace and the monitor seismic trace comprises applying, to the time-shifted base seismic trace, an estimated wavelet convolved with a time-shifted change in reflection coefficient.

13. The non-transitory, tangible, computer-readable storage medium of claim 12, wherein compensating for amplitude changes between the base seismic trace and the monitor seismic trace further comprises applying a scalar to the time-shifted change in reflection coefficient based on a linear relationship between a density perturbation between the base seismic trace and the monitor seismic trace and the velocity perturbation along with fluid change in the hydrocarbon reservoir.

14. The non-transitory, tangible, computer-readable storage medium of claim 12, wherein the instructions to characterize changes of at least part of the hydrocarbon reservoir using the final estimated velocity perturbations comprise instructions to update at least a portion of a velocity map of the hydrocarbon reservoir.

15. A system, comprising:
a memory storing instructions; and
a processor coupled to the memory and configured to execute the instructions, which cause the processor to be configured to:
receiving a base seismic trace of a base seismic survey and a monitor seismic trace of a monitor seismic survey, the base seismic survey and the monitor seismic survey being associated with the hydrocarbon reservoir and taken at different respective times by applying a seismic waveform at approximately the same position on a ground leading to respective propagation paths for a seismic waveform through the ground at the different respective times;
generating a predicted monitor seismic trace based on the base seismic trace and the monitor seismic trace, wherein generating the predicted monitor seismic trace from the base seismic trace comprises:
estimating initial velocity perturbations occurring between the base seismic id the monitor seismic trace, the estimated initial velocity perturbations relating changes in velocity for the seismic waveform through the hydrocarbon reservoir;
applying a time shift to the base seismic trace based on the estimated initial velocity perturbations; and
compensating for amplitude changes between the base seismic trace and the monitor seismic trace, the time shift being applied to the amplitude changes to generate the predicted monitor seismic trace, wherein the base seismic trace, monitor seismic trace, and predicted monitor seismic trace are different seismic traces;
minimizing, until a predetermined convergence is reached, a difference between the predicted monitor seismic trace and the monitor seismic trace by iteratively estimating the estimated initial velocity perturbations to obtain final estimated velocity perturbations; and
producing a velocity perturbation map using at least the final estimated velocity perturbations, the velocity perturbation map indicating changes in geological characteristics of the hydrocarbon reservoir between the base seismic survey and the monitor seismic survey.

16. The system of claim 15, wherein the instructions further cause the processor to be configured to apply, to each sample point of the base seismic trace to which the time shift has been applied, an estimated wavelet convolved with a time-shifted local change in reflection coefficient.

17. The system of claim 16, wherein the time-shifted local change in reflection coefficient corresponds, for each sample point, to a difference in velocity perturbation between the respective sample point and an adjacent sample point on the base seismic trace.

18. The system of claim 17, wherein the adjacent sample point is a point sampled a single sampling interval after sampling the respective sample point.

19. The system of claim 18, wherein the instructions further cause the processor to be configured to sample the base seismic trace and the monitor seismic trace at a sampling interval of 1 millisecond (ms) or less.

20. The system of claim 17, wherein the instructions further cause the processor to be configured to apply a scalar to the time-shifted local change in reflection coefficient based on an assumed linear relationship between a density perturbation between the base seismic trace and the monitor seismic trace and the velocity perturbation along with fluid change in the hydrocarbon reservoir.

* * * * *